Jan. 1, 1952     A. GODMAIRE     2,581,095
WRENCH SOCKET
Filed May 7, 1946

Aimé Godmaire   Inventor
By
                Attorneys

Patented Jan. 1, 1952

2,581,095

UNITED STATES PATENT OFFICE 2,581,095

WRENCH SOCKET

Aimé Godmaire, Montreal, Quebec, Canada

Application May 7, 1946, Serial No. 667,829

1 Claim. (Cl. 81—90)

The present invention relates to a socket and more particularly a socket especially adapted for engaging and turning objects having a projecting, transverse, generally rectangular head.

The socket of this invention has been devised particularly to adjust anchor pins of the type used in automotive brakes. These anchor pins have a transverse bar of generally rectangular shape in the head thereof, by means of which adjustment is made. The anchor pins are located in the braking system underneath the automobile where they are exposed to moisture and dirt and as a result become rusty and difficult to move. In addition to becoming rusty the pins are relatively inaccessible rendering the turning thereof by ordinary tools very difficult. Furthermore due to vibration the pins often become seized.

To overcome the disadvantages set out above, the inventor has provided a novel socket to engage the anchor pins and to move the same with a minimum of effort even though they are rusty and seized. The socket functions easily and efficiently in the most inaccessible parts of an automotive braking system.

The present invention comprises a metallic socket having apertures in the ends thereof specially designed to engage the transverse bars of the anchoring pins as described above. The exterior of the socket is shaped to be gripped by any turning means such as a socket wrench or the like.

The accompanying drawings and the detailed description thereof, will assist in a proper understanding of the invention:

In the accompanying drawings it will be understood that the illustration of the socket other than the engaging jaws, is purely illustrative and changes may be made in the form of the socket, its method of construction and exterior shape without departing from the scope of the invention.

Throughout the drawings the socket is shown generally by the letter S and the anchor pins with which it is associated in use by the letter A.

Figures 1, 2:
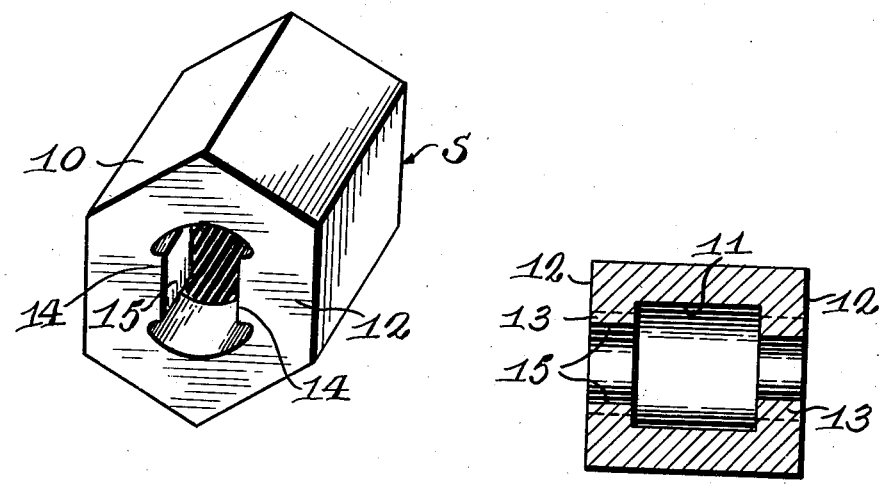
Figure 1 is a perspective view of the socket.
Figure 2 is a longitudinal section.

Referring to Figures 1 and 2, the body of the socket is shown at 10, and may consist of a solid bar of steel having a hexagonal exterior and a recessed interior as shown at 11. It may be desirable to construct the socket without the interior recess 11, or with a exterior of other shapes rather than hexagonal. The socket S has two parallel end faces shown at 12. Apertures 13, may be provided in either or both ends of the parallel faces 12, for the purpose to be described hereinafter.

Extending inwardly from the walls of the aperture 13, are two opposed jaws shown at 14, the faces 15 of which may be generally rectangular in outline. The jaws should be constructed of a steel capable of being hardened so that they will not lose their efficiency in operation because they are too soft. In the construction described above, the jaws 14 are formed integrally with the body 10 of the socket. However, it may be desirable to construct the socket from low carbon steel tubing and the jaws 14 from high carbon tool steel, welding the latter to the interior walls of the former. The socket as mentioned above may be constructed with an engaging aperture at either end or at both ends if it is so desired. The size of the engaging jaws may be the same at both ends, or one end may have a larger aperture and a larger set of engaging jaws if so desired.

Figures 3, 4:
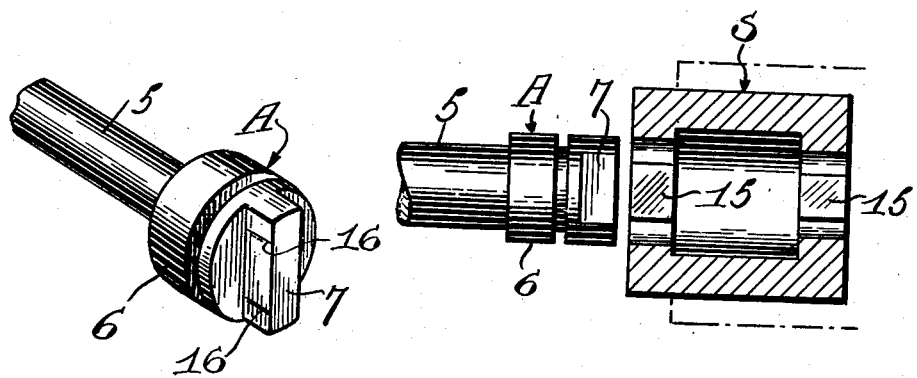
Figure 3 is a perspective view of the anchor pins.
Figure 4 is a longitudinal view of the socket and a side elevation of the anchor pin just prior to the engagement of the socket and pin.

The anchor pin shown generally at A in Figure 3, consists of a stem 5, having a head 6. On this head 6, there is usually provided a transverse rectangularly shaped lug or bar 7 intended to act as the means by which the pin is engaged for adjustment purposes.

One of the novel features of the invention is the relationship in size of the engaging jaws 14, and the projecting transverse bar 7 of the anchor pin. It will be noted that both the engaging jaws and the transverse pin are generally rectangular in section and that the faces of the jaws are adapted to engage the lateral faces of the transverse bar 7. The distance between the faces 15 of jaws 14 may be somewhat greater than the thickness of the transverse bar 7, thus allowing the jaws to be easily slipped over the projecting bar 7 in order to engage the same. Another feature of the relationship in size between the engaging jaws and the engaged bar is that the length of the faces 15 may be considerably less than the length of the rectangular bar 7. Hence the faces 15 will always engage and have ample bearing area on the bar 7. The jaws being hardened they will tend to dig into the faces of the projecting bar 7, as is shown at 16, in Figure 3.

Another essential feature of the invention is the horizontal depth of the apertures 13, which should be greater than the maximum distance which the transverse bar 7 extends from the supporting base thereof.

The apertures 13 are preferably circular in shape, but the invention is not restricted to such a shape and apertures of any other outline may be used providing, however, that the aperture is always greater in diameter in any direction than the length of the rectangular projecting bar 7.

In operation the socket is slipped over the projecting bar 7, a procedure which, owing to the difference of dimensions mentioned above, may be accomplished with ease. When the socket is turned, the bearing edges of the jaws will tend to indent the bar 7, and, owing to the latter being longer than the former, will securely grip the same without the slipping which takes place with conventional tools. The sockets may be turned by any conventional means available to the ordinary mechanic.

In use the invention has proved to be of great advantage to mechanics working on braking systems or the like and permits of the removal or adjustment of such features as anchor pins without the toilsome effort experienced with prior art devices. The convenience of the socket is also an advantage when working in relatively inaccessible locations particularly as experienced in the braking apparatus of automotive wheels.

What I claim is:

A socket of the character described, for turning automotive brake anchor pins having an external diametral bar, said socket having a body of outside polygonal shape for engagement by a suitable turning tool, the body being formed with an axial aperture of substantially circular shape and such as to allow penetration of an anchor pin bar therein, and a pair of diametrically spaced jaws projecting inwardly in the axial aperture and having their working faces opposed, said opposing faces being flat and lying along parallel chords of the aperture, the length of said faces along the chords being approximately half the diameter of the aperture, the edges of the jaws perpendicular to said parallel chords being sharp so as to bite into the bar when a turning movement is applied to the socket.

AIMÉ GODMAIRE.

REFERENCES CITED

The following references are of record in the file of this patent:

UNITED STATES PATENTS

| Number | Name | Date |
| --- | --- | --- |
| 236,114 | Totten | Dec. 28, 1880 |
| 1,188,305 | Noerteman | June 20, 1916 |
| 1,926,760 | Albrecht | Sept. 12, 1933 |
| 2,197,283 | Ward | Apr. 16, 1940 |
| 2,383,573 | Tomsek | Aug. 28, 1945 |
| 2,445,905 | Busby | Dec. 3, 1945 |
| 2,421,665 | Umbdenstork | June 3, 1947 |

FOREIGN PATENTS

| Number | Country | Date |
| --- | --- | --- |
| 11,730 | Great Britain | June 5, 1905 |